United States Patent
Daily et al.

(10) Patent No.: US 8,838,381 B1
(45) Date of Patent: Sep. 16, 2014

(54) AUTOMATIC VIDEO GENERATION FOR NAVIGATION AND OBJECT FINDING

(75) Inventors: Michael Daily, Thousand Oaks, CA (US); Ronald Azuma, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1197 days.

(21) Appl. No.: 12/590,575

(22) Filed: Nov. 10, 2009

(51) Int. Cl.
*G06T 15/00* (2011.01)

(52) U.S. Cl.
USPC ........... 701/436; 701/428; 701/433; 701/516; 345/632; 345/633

(58) Field of Classification Search
USPC ................. 701/428, 431, 433, 436, 454, 516; 345/629, 632, 633, 638
See application file for complete search history.

(56) References Cited

U.S. PATENT DOCUMENTS

| | | | |
|---|---|---|---|
| 5,872,575 A | 2/1999 | Segal | |
| 6,906,643 B2 | 6/2005 | Samadani et al. | |
| 7,149,961 B2 | 12/2006 | Harville et al. | |
| 7,405,746 B2 * | 7/2008 | Wakimoto et al. | 348/116 |
| 7,557,736 B1 * | 7/2009 | Daily et al. | 340/995.1 |
| 7,688,229 B2 * | 3/2010 | Sula et al. | 340/995.17 |
| 7,728,869 B2 * | 6/2010 | Jung | 348/113 |
| 7,737,965 B2 * | 6/2010 | Alter et al. | 345/419 |
| 7,826,967 B2 * | 11/2010 | Jung | 701/439 |
| 7,974,781 B2 * | 7/2011 | Emoto et al. | 701/436 |
| 8,086,071 B2 * | 12/2011 | Chen et al. | 382/284 |
| 8,296,063 B1 * | 10/2012 | Baillot | 701/434 |
| 2004/0167714 A1 * | 8/2004 | Macphail | 701/213 |
| 2005/0035883 A1 * | 2/2005 | Kameda et al. | 340/995.1 |
| 2006/0287819 A1 * | 12/2006 | Brulle-Drews et al. | 701/211 |
| 2007/0150188 A1 * | 6/2007 | Rosenberg | 701/211 |
| 2008/0319655 A1 * | 12/2008 | Vande Velde | 701/208 |
| 2010/0017124 A1 * | 1/2010 | Zhao et al. | 701/212 |
| 2010/0191459 A1 * | 7/2010 | Carter et al. | 701/208 |
| 2011/0102637 A1 * | 5/2011 | Lasseson | 348/239 |

OTHER PUBLICATIONS

J. Harrison, D. Kliman and W. Roper, "Dynamic Visualization of Urban Terrain: Movement to Navigation in 4D Virtual Worlds," In Proc. SPIE, vol. 4741, pp. 317-328, 2002.*

(Continued)

*Primary Examiner* — Thomas Black
*Assistant Examiner* — Peter D Nolan
(74) *Attorney, Agent, or Firm* — Tope-McKay & Associates

(57) ABSTRACT

Described is a system for conveying the spatial location of an object with respect to a user's current location utilizing a video rendering following an automatically generated path from the user's location to the location of the object of interest initiated from the user's current perspective. The system comprises a display device; a virtual three-dimensional model of the user's environment; a visualization creation module; a route planner; and a video rendering following an automatically generated path from the user's location to the location of the object of interest utilizing the visualization creation module, wherein the video rendering displayed on the display device is from a first-person view. Also described is a method of utilizing the system.

12 Claims, 16 Drawing Sheets
(12 of 16 Drawing Sheet(s) Filed in Color)

(56) References Cited

OTHER PUBLICATIONS

C. Callan and J. Goodman, "Sensors to Support the Soldier," JSR-04-210, MITRE Corporation, Feb. 3, 2005.*

E. Foxlin and L. Naiimark, "VIS-Tracker: A Wearable Vision-Inertial Self-Tracker," IEEE VR2003, Mar. 22-26, 2003, Los Angeles.*

Onno Goemans, Mark Overmars, "Automatic generation of camera motion to track a moving guide," 2004, Report from the MOVIE (Motion Planning in Virtual Environments) project.

McDowell et al., "Delta 3D: A Complete Open Source Game and Simulation Engine for Building Military Training Systems," JDMS, vol. 3, Issue 3, Jul. 2006, p. 143-154.

* cited by examiner

| Time (ms) | User 1 (U1) | Remote Server | Assumptions |
|---|---|---|---|
| Earlier | Task- Move to Objective | Load Task Model | Task model captures set of tasks and expected times. Used to set state of server. |
| 0 | Snap Image | | U1 image tagged with position and orientation from GPS, digital compass |
| 100 | | Receive Image from U1 | 100 ms to package and send 320x240 pixel image over 802.11g network in close proximity |
| 200 | | -Access Task Model for U1<br>-Generate Objective Location | 100 ms to grab a task model for U1 out of memory and pull out most likely objective |
| 300 | | Generate Render Path | 100 ms to plan a best path to the objective function from U1 pose to objective |
| 1300 | | Render Video Clip | 1000 ms to render 300 frames at 320x240 resolution compressed |
| 1400 | | Auto Overlay | 100 ms to overlay object location from stored critical overlays |
| 1450 | | Return to U1 | 50 ms to package and send video |
| 1650 | Play Video | | 200 ms to send full compressed video (~1MB) over 802.11g network in close proximity. Play of streaming video can start after 200 ms of elapsed time at U1. |
| 11650 | Complete | | 10 elapsed seconds of video playback. Could be played at faster or slower than real-time. |

FIG. 16

AUTOMATIC VIDEO GENERATION FOR NAVIGATION AND OBJECT FINDING

BACKGROUND OF THE INVENTION (1) Field of Invention

The present invention relates to a system for conveying the spatial location of an object with respect to a user's current location and, more particularly, to a system utilizing a video following an automatically generated path from the user's location to the location of the object of interest initiated from the user's current perspective.

(2) Description of Related Art

Navigation systems have long been known in the art. In particular, navigation systems for use in vehicles are now common and aid in guiding a driver from one location to another in unfamiliar environments. Additionally, navigation systems for handheld personal digital assistants (PDAs) have become more popular and offer portability to the user. Both navigation systems require the user to first specify a particular destination of interest, utilize a global positioning system (GPS) to measure the current location, and, finally, apply route-planning algorithms to determine the path from the navigation system to the desired destination. Furthermore, programs are available over the Internet, which provide similar capabilities without a GPS sensor. For instance, programs such as Google Maps and MapQuest allow a user to manually enter a start point and a destination point to retrieve a route for traveling between the two points. Google Maps and MapQuest are produced by Google, Inc., located at 1600 Amphitheatre Parkway, Mountain View, Calif. 94043.

Typically, results of both GPS-dependent systems as well as Internet programs are displayed as two-dimensional or three-dimensional maps from a top-down, or bird's eye, view. Such viewpoints can be confusing or ambiguous if the user is in an unfamiliar environment. Importantly, existing handheld computing devices lack the ability to estimate the orientation (e.g., roll, pitch, and yaw) of the device. The orientation of the device would be essential if the user were to require a generated path from a first-person, street-level view to minimize the potential cognitive load of having to translate a top-down view to a real-world view in unfamiliar environments.

Thus, a continuing need exists for a navigation system conveying the spatial location of an object with respect to a user's current location from the user's current perspective, using automatic video generation with the ability to estimate position and orientation.

SUMMARY OF THE INVENTION

The present invention relates to a system for conveying the spatial location of an object with respect to a user's current location utilizing a video following an automatically generated path from the user's location to the location of the object initiated from the user's current perspective.

The system comprises a display device, a virtual three-dimensional model of a user's environment, a route planner configured to generate a route given a start location and an end location, wherein the start location is the user's current location and the end location is the location of an object, and a visualization creation module configured to create a video following a route created by the route planner, wherein the video is displayed on the display device starting from the user's current perspective.

In another aspect, the display device further comprises sensors for estimating the user's position and orientation.

In another aspect, the sensors of the display device are selected from a group consisting of tilt and accelerometer sensors.

In yet another aspect, the display device further comprises a camera configured to capture images, such that the images provide information regarding the user's current location.

In another aspect, the system further comprises a remote server for communication with the display device.

In another aspect, the video is a combination of actual imagery and a virtual three-dimensional model of the user's environment.

In another aspect, the visualization creation module utilizes faster than real-time rendering of the sequences of frames for the video.

As can be appreciated by one in the art, the present invention comprises a method for using the system described herein.

Finally, as can be appreciated by one in the art, the present invention comprises a computer program product embodying the system described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 16 is a table illustrating a timeline for a typical capture and generate phase according to the present invention.

DETAILED DESCRIPTION

Figure 1:
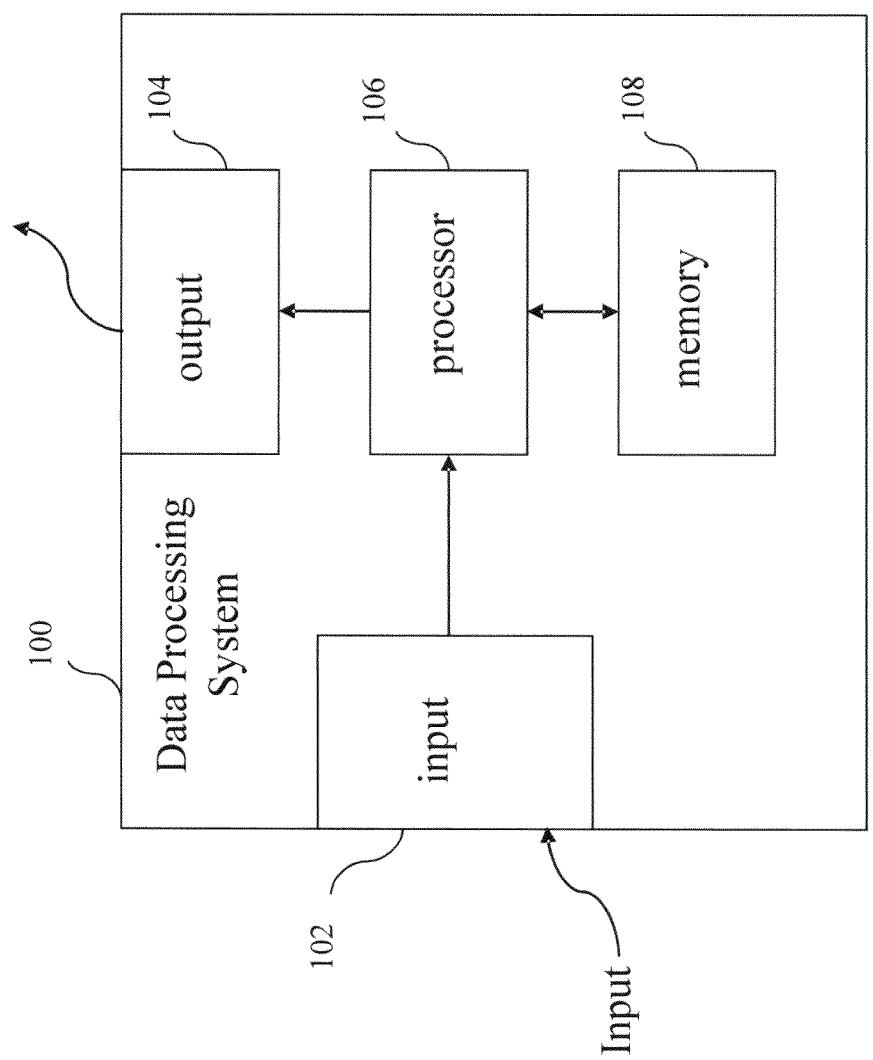
FIG. 1 is an illustration of a video generation system according to the present invention.

The present invention relates to a system for conveying the spatial location of an object with respect to a user's current location and, more particularly, a system utilizing a video rendering following an automatically generated path from the user's location to the location of the object of interest initiated from the user's current perspective. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is an automatic video generation system for navigation and object finding. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Introduction

The present invention relates to a system for conveying the spatial location of an object with respect to a user's current location utilizing a video following an automatically generated path from the user's location to the location of the object, initiated from the user's current perspective. The system comprises a display device; a virtual three-dimensional model of a user's environment; a route planner configured to generate a route given a start location and an end location, wherein the start location is the user's current location and the end location is the location of an object; and a visualization creation module configured to create a video following a route created by the route planner, wherein the video is displayed on the display device starting from the user's current perspective. To present the reader with a clear understanding of the present invention, a description of the elements required is provided.

The visualization creation module generates a video representation following a route provided by a route planner. Route planners presently exist in the art. Given a start location, and end location, and other controlling parameters, algorithms are currently available to generate routes. These approaches will be utilized to generate a route for the visualization creation module. Additionally, the visualization creation module utilizes an environment model which is a virtual three-dimensional model of a user's current environment. Finally, a display device may be used not only to display the video representation of the path from a user's current location to an object of interest but also to provide user location information as well as capture images of the current environment.

(3) Specific Details

The present invention relates to a navigation system which generates a video rendering following an automatically generated path from the user's current location to the location of the object of interest. Specifically, a purpose of the present invention is to identify the spatial location of an object and a user and provide an intuitive and easy to comprehend route to the object from the user's current location. A video of the route is displayed on a display device. The video may include both actual images and three-dimensional models of a virtual environment following an automatically generated path from the user's current location to the object of interest.

To identify the spatial location of a user, the user's position and orientation can be estimated utilizing a few approaches. For example, a global positioning system (GPS) can provide an estimate of the user's position. However, recovering orientation is more difficult. In one aspect, the display device may include an inertial sensor, such as a motion sensor (e.g., accelerometer) or a rotation/tilt sensor (e.g., gyroscope) sensors. Single or multi-axis models of accelerometers can be used, which detect magnitude and direction of acceleration as a vector quantity and can be used to sense orientation. Gyroscopes measure the angular velocity of a system in the inertial reference frame. By using the original orientation of the system in the inertial reference frame as the initial condition and integrating the angular velocity, the system's current orientation is known at all times. Accelerometers measure the linear acceleration of the system in the inertial reference frame, but in directions that can only be measured relative to the moving system. By keeping track of both the current angular velocity of the system and the current linear acceleration of the system measured relative to the moving system, it is possible to determine the linear acceleration of the system in the inertial reference frame. When the display device is held still, the sensors provide an accurate estimate of roll and pitch. An electromagnetic compass may be added to detect yaw. These sensors then directly measure all three components of orientation.

In another embodiment, the display device includes a camera to capture an image of what the user sees. Computer vision algorithms can be used to estimate yaw instead of an electromagnetic compass. For example, if there is a recognizable landmark, then standard object recognition algorithms will be used to find that landmark in the recorded image and compare that against what is rendered in the environment model. That single point (i.e., the landmark) is sufficient to determine yaw.

In addition, the single point may be used to determine roll and pitch if the object is known. Alternatively, the environment can be rendered from a known position. To estimate yaw, template matching will compare the recorded image against rendered images (e.g., render 360 different images with yaw values spaced one degree apart). The value that provides the closest match will become the estimate of yaw.

In yet another embodiment, the display device may not have any orientation sensors. Instead, an image from the user's perspective is taken with the camera of the display device. Given the measured position of the user, an environment map is rendered, which is a spherical image of the world as seen from the user's viewpoint. The recorded image can then be matched against the environment map. Thus, given the known field-of-view of the camera, the size of the image inside the environment map is known. The roll, pitch, and yaw parameters can then be adjusted to seek the best match between the recorded image and the part of the spherical environment map indicated by the orientation and field-of-view. The template match can be performed through standard approaches, such as normalized cross-correlation or by finding and comparing features in both the recorded image and the environment map.

As would be obvious to one skilled in the art, the present invention can be applied to both civilian and military uses. A non-limiting example of a military use is a situation where users (e.g., soldiers) operating in urban environments need to be informed of objects of interest which are not in their direct view in order to prepare themselves mentally and physically. The urban environment is complex, and soldiers are often sent to locations that are not familiar to them. Because of this disadvantage, soldiers need to receive information regarding objects of interest (e.g., potential threats) in a manner that is easy to understand in order to minimize their cognitive workload.

Ideally, the system will work rapidly so that the video is received within seconds of the user pressing the button. This generates the perception of starting from the perspective of what the user is currently viewing, transitioning into a video that begins with the very same first image and proceeding smoothly from the initial viewpoint to an object's location. This seamless transition is essential to the present invention to enable the user to understand the information as quickly and easily as possible. Importantly, a key feature necessary for the visualization creation module to operate in real-time is the much faster than real-time rendering of the sequence of frames that will compose the video. This feature gives the appearance to the user that the video begins to play forward in time immediately after the process is initiated. Thus, the user does not need to mentally perform any spatial transformations as might be required with the use of navigation systems that display a route from a top-down perspective. Rather, the user views where the object is with respect to the user's current position and orientation simply by watching the path displayed in the video.

A block diagram depicting the general components of an automatic video generation system of the present invention is provided in FIG. 1. The system 100 comprises an input 102 for receiving information from at least one sensor for use in generating a video representing a scene. Note that the input 102 may include multiple "ports." Typically, input is received from at least one sensor, non-limiting examples of which include orientation sensors. An output 104 is connected with the processor for providing the video to a display device or information to other systems in order that a network of computer systems may serve as a video generation system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
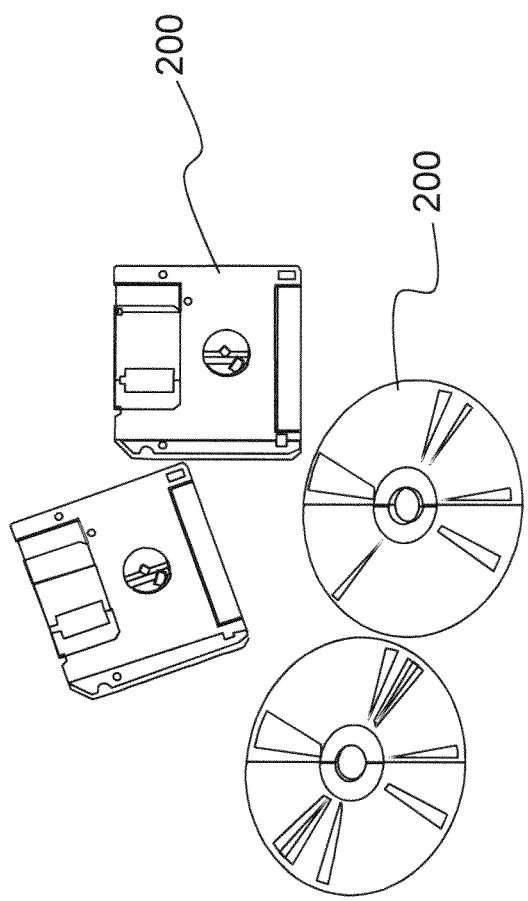
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

Figure 3A:
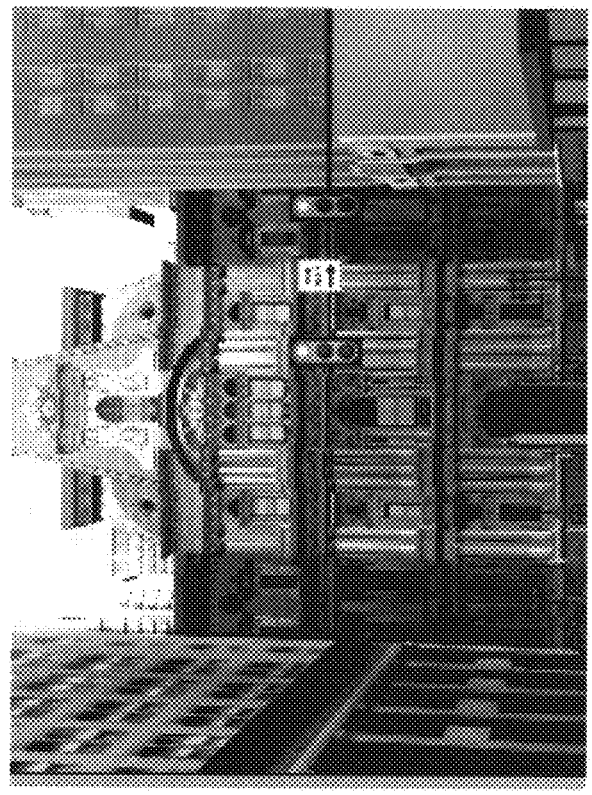
FIG. 3A is a photograph of a building.
Figure 3B:
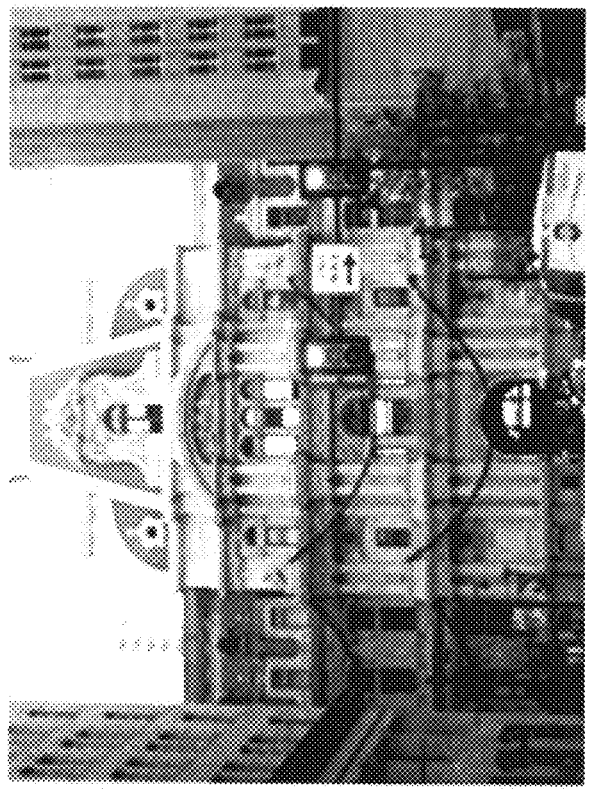
FIG. 3B illustrates a virtual three-dimensional model of a building according to the present invention.

The virtual three-dimensional model of an environment of a user, also known as the environment model, is one of the essential components for generating a video comprising a realistic representation of the environment. In addition, the environment model provides the capability of rendering images of the environment from different viewpoints. To illustrate the environment model, FIG. 3A is a photograph of a building and FIG. 3B is the virtual three-dimensional model of the same building (i.e., the building illustrated in FIG. 3A).

Figure 4:
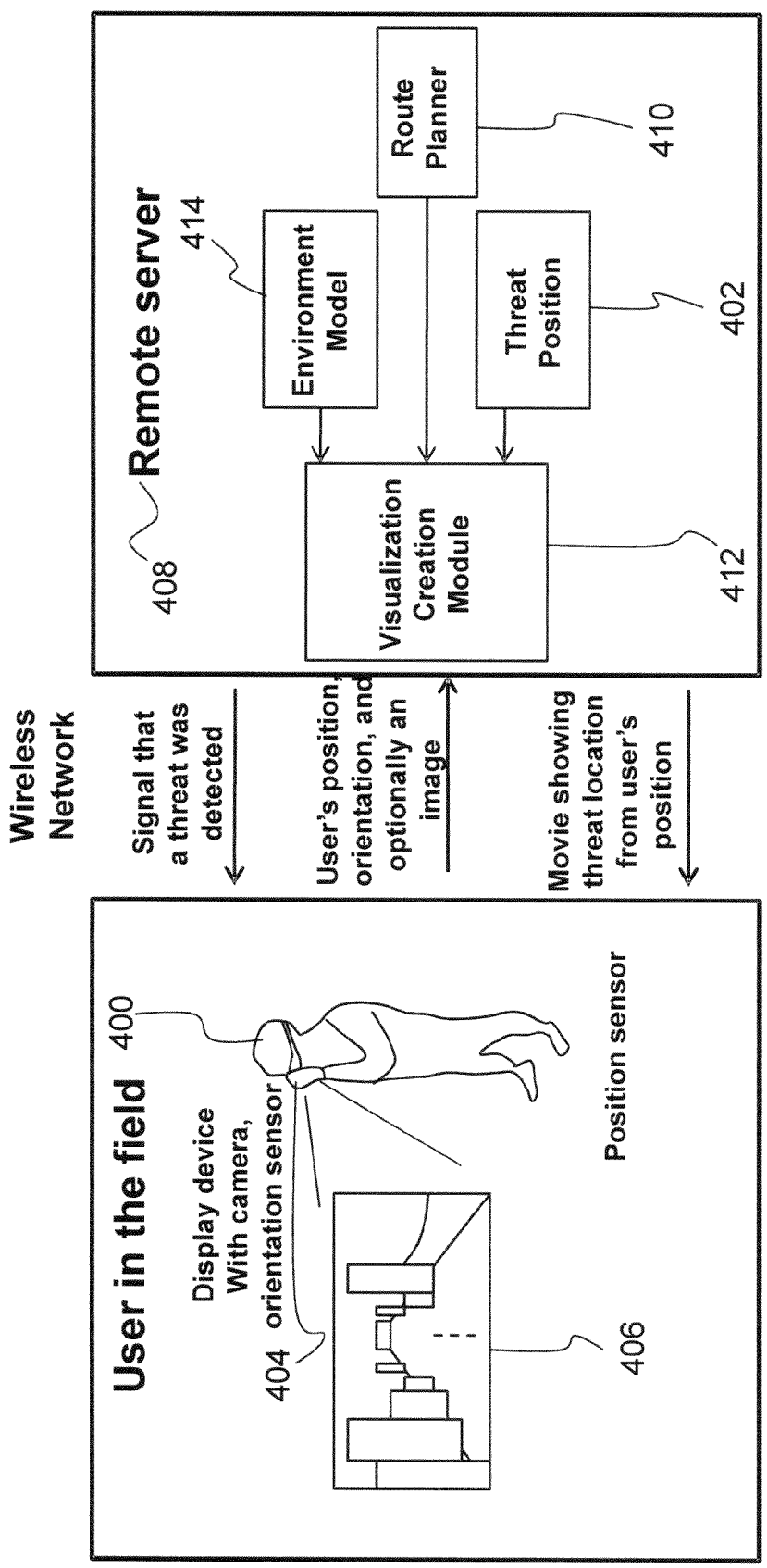
FIG. 4 illustrates a system concept overview of the present invention.
Figure 5:
FIGS. 5-15 illustrate still frames from a video according to the present invention.
Figure 6:
Figure 7:
Figure 8:
Figure 9:
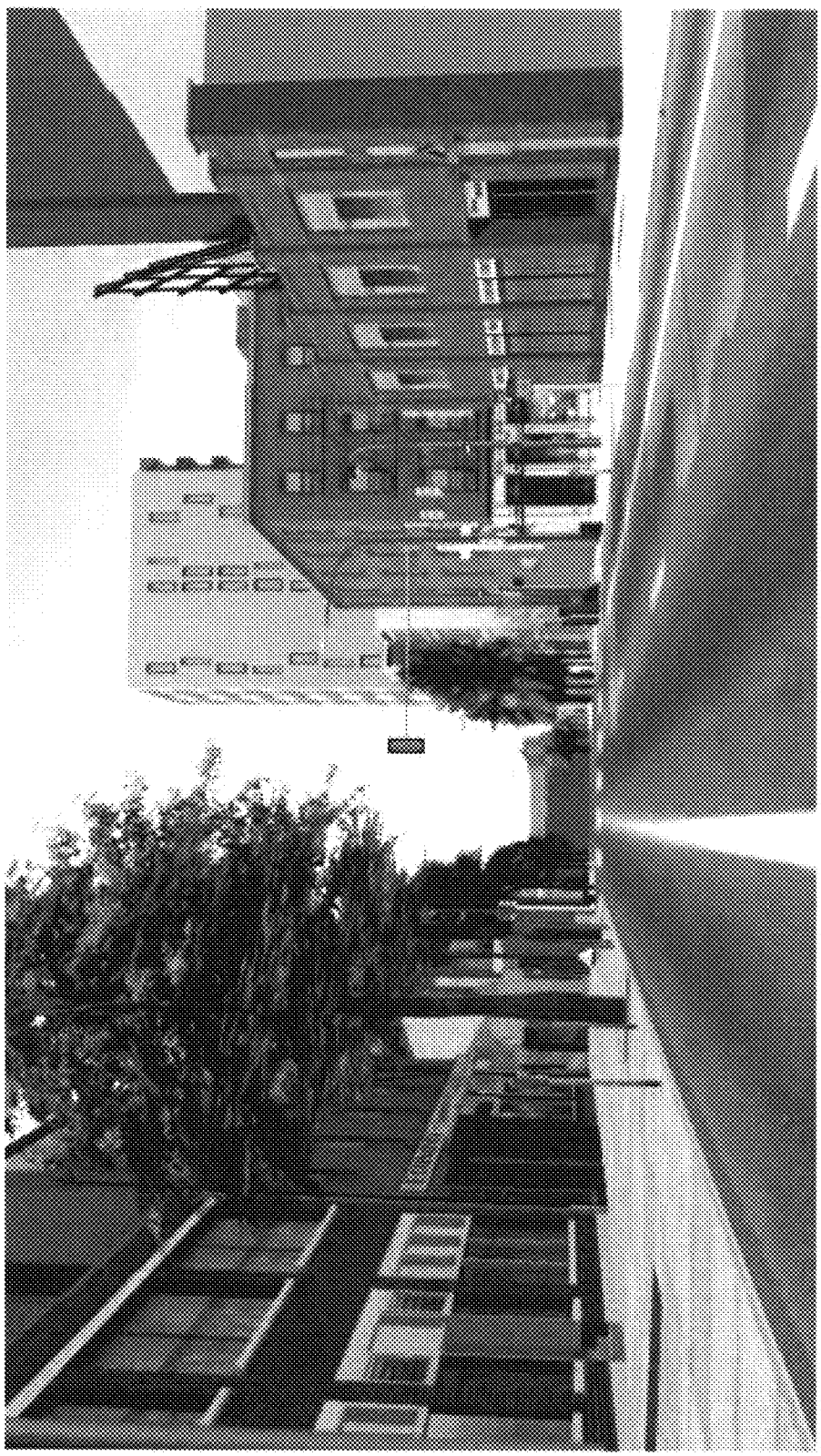
Figure 10:
Figure 11:
Figure 12:
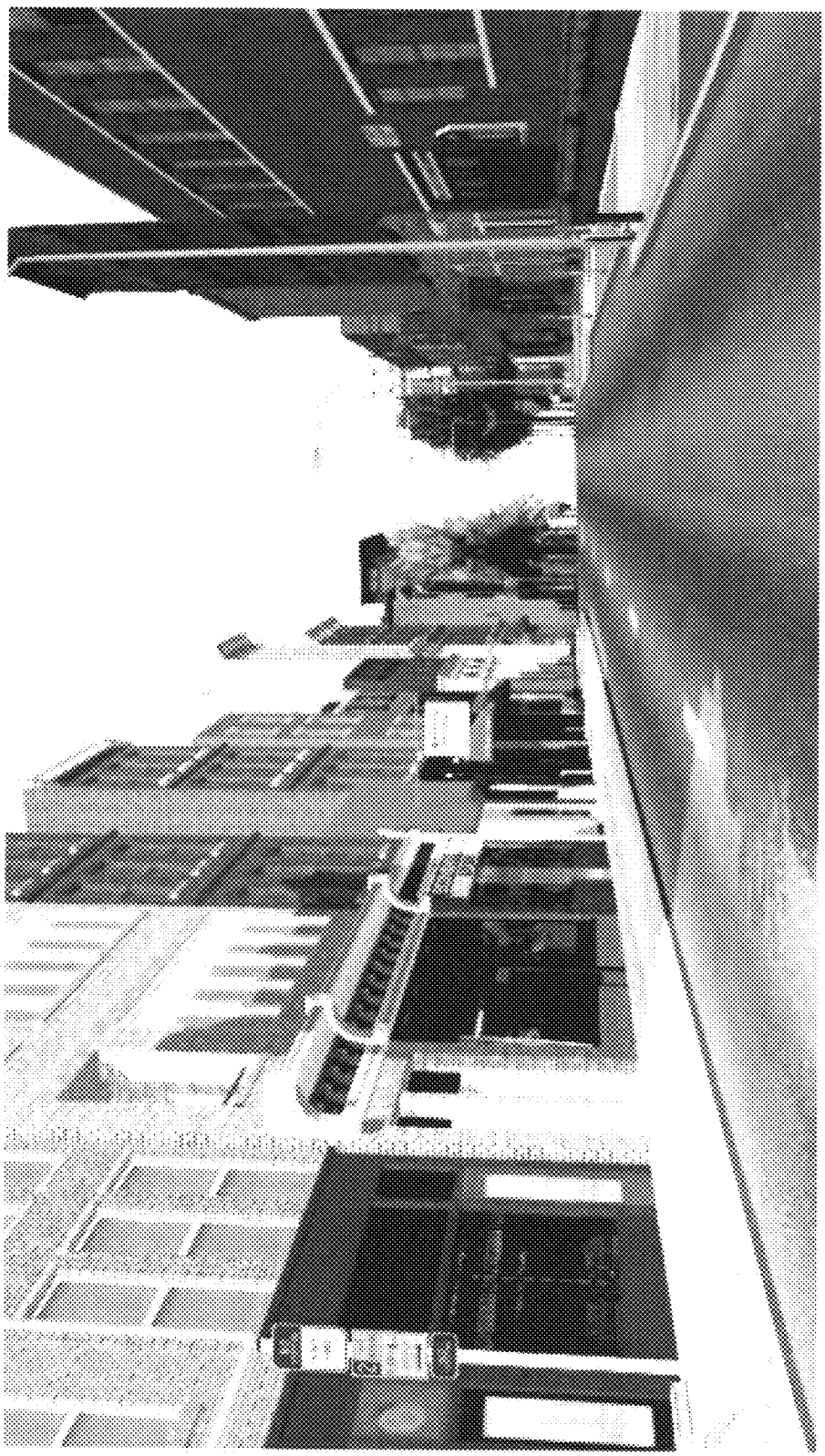
Figure 13:
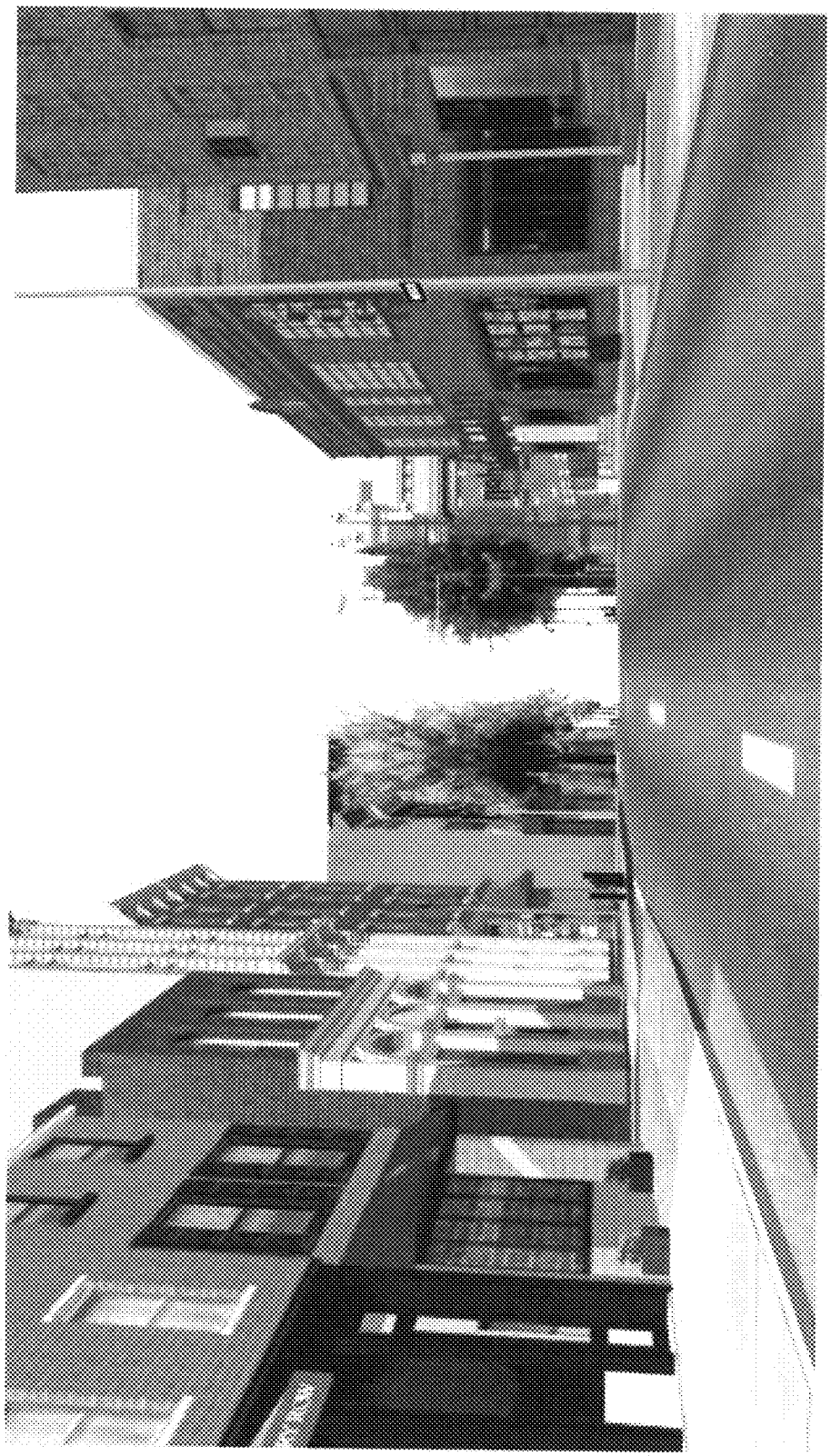

FIG. 4 illustrates a non-limiting example of an application of the present invention. A user 400 (e.g., soldier) in the field needs to be informed of a location of an object of interest 402 (e.g. threat). A signal is sent to the user 400 asking him to raise a display device 404, a non-limiting example of which is hand-held. When it is safe for the user 400 to do so, the user 400 raises the display device 404 and presses a button. This action allows the user 400 to capture an image 406 of the user's 400 current view of the environment. This image 406 and a measurement of the user's 400 position and orientation are sent back to a remote server 408. Based on this information and the position of the object of interest 402, a route planner 410 generates a route from the user 400 to the object of interest 402. A non-limiting example of a suitable route planner is a computer program that utilizes a graph search algorithm which solves the single-source shortest path problem for a graph with non-negative edge path costs, outputting a shortest path tree. This algorithm is known as Dijkstra's algorithm and is often used in route planning. There are numerous examples of algorithms for path planning and generating routes from a starting point to an ending point, given various constraints. Algorithms such as this are utilized in applications such as Google Maps and MapQuest. The route planner of the present invention assumes the existence of previous route-planning algorithms and uses such algorithms to determine an optimal route between two given points.

A visualization creation module 412 then generates a video representation following the provided route based on images from a virtual three-dimensional environment model 414. A non-limiting example of such a visualization creation module is a computer program which uses rendering to add bitmap textures or procedural textures, lights, bump mapping, and relative position of other objects to an image. The image may be a digital image or raster graphics image. In order to generate a video representation, several images may be rendered and stitched together with the use of a computer program capable of making an animation of this sort, a non-limiting example of which is a three-dimensional image editing program. Non-limiting examples of open source options for the visualization creation module include OpenSceneGraph and Delta3D as described by McDowell et al. in "Delta 3D: A Complete Open Source Game and Simulation Engine for Building Military Training Systems" in JDMS, Vol. 3, Issue 3, pg. 143-154, 2006, which is hereby incorporated by reference as though fully set forth herein. The video is transmitted to the user 400 who watches the video on the display device 404 to learn the location of the object of interest 402.

Figure 14:
Figure 15:
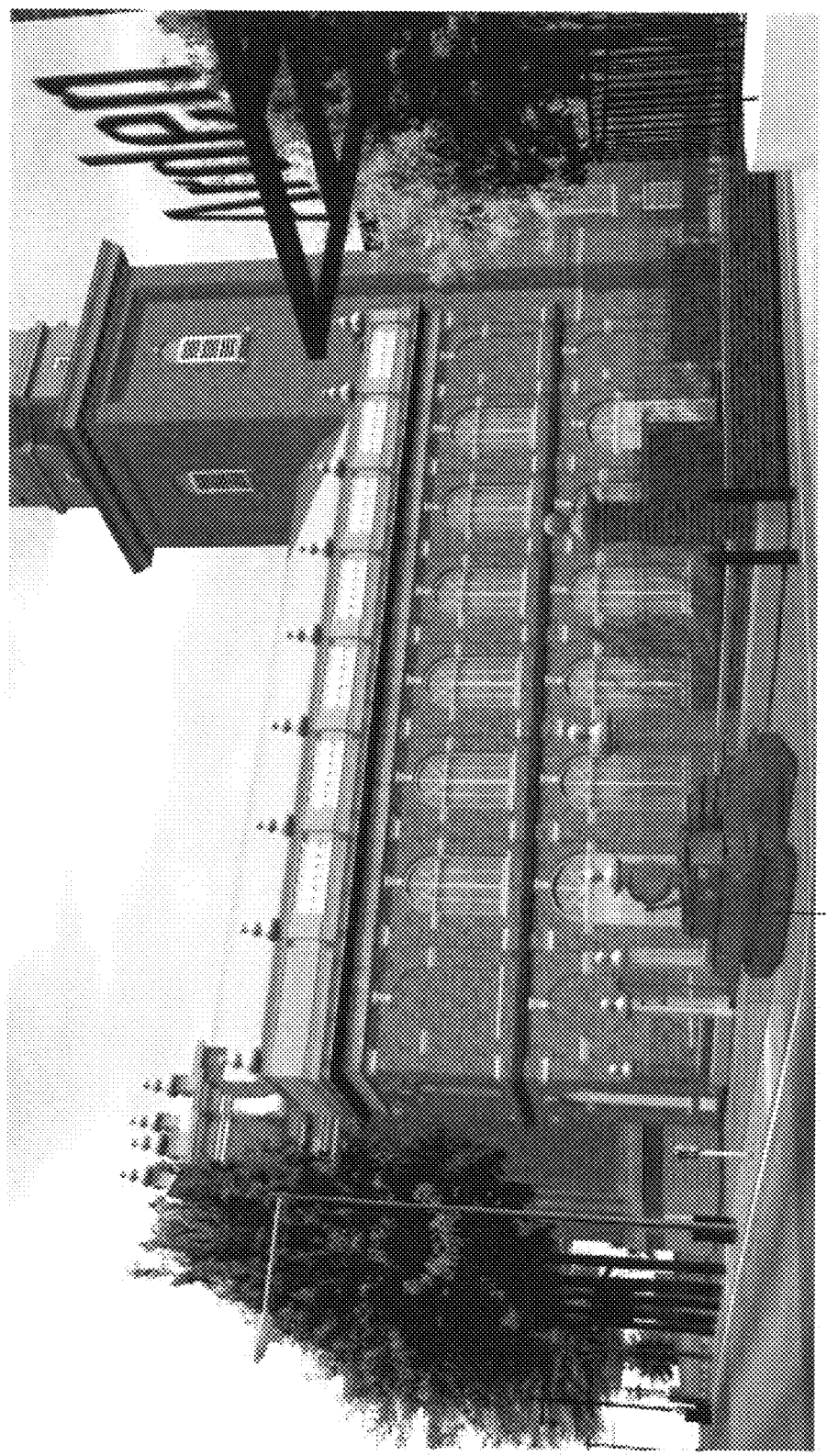

FIGS. 5-13 display selected still frames from an example video generated by the present invention depicting a route from a start location through a three-dimensional environment model of a city created by the visualization creation module. FIG. 14 illustrates a still frame from the video where an object of interest 1400 (e.g., military vehicle) first comes into view along the route. As illustrated in FIG. 15, the object of interest 1400 is now in full view and the end location on the route has been reached.

As can be appreciated by one skilled in the art, additional capabilities and modes are possible in various embodiments of the system. For instance, in many cases, the user may decide to initiate the process of capturing and rendering a hybrid sequence of imagery, as opposed to receiving the information first from a remote server. To accomplish this task, the user takes a picture with a camera on the display device. Either through a preset action that follows capturing an image or a deliberate action on the part of the user, the image is sent through a wireless network to the remote server. At the remote server, the context in which the image was acquired is used to determine the desired output. This is accomplished using explicit or learned models (e.g., implemented as probabilistic belief networks) of the user's current task, possibly as extensions to the environment model.

In another embodiment, rather than initiating the video generation process with an image, a rendering from the user's eye point is created with a pose of the user's head, such as using a personal head-worn device. The resulting completely rendered video therefore starts from the user's current eye-point.

As described above, the system will ideally work rapidly so that the video is received within seconds of the user pressing the button. This rapid transition is significant to the present invention to enable the user to understand the information as quickly and easily as possible. A table 1600 representing a timeline for a typical capture and generate phase for the present invention is illustrated in FIG. 16. As shown, an image is captured by a user (U1) at a starting time of 0 milliseconds (ms) 1602. The image is received from the user at the remote server 100 ms later 1604. Within 200 ms from the start time, the remote server accesses a task model for the user out of memory and generates a most likely objective location 1606. At 300 ms, the remote server generates a render path 1608, which plans a best path to the objective location from the user's current pose/position. It takes 1 second (1000 ms) to render a video clip 1610. It takes approximately 1400 ms from start time for the remote server to overlay the objective location from stored critical overlays 1612. At 1450 ms, the generated video is packaged and sent to the user 1614. Within another 200 ms, the user can play streaming video sent from the remote server 1616. Finally, at approximately 11,650 ms (or 11.65 seconds), the process is complete and the user has viewed 10 elapsed seconds of video playback, which can be played at faster or slower than real-time 1618.

As can be appreciated by one skilled in the art, the present invention could also be useful in civilian applications. As an in-vehicle navigation system, the present invention provides an advantage over most current navigation systems which provide route information through top-down views of two-dimensional maps. Directions and the spatial location of the destination may be easier to understand if created in the manner described above.

What is claimed is:

1. A system for conveying the spatial location of an object with respect to a user's current location, the system comprising:
    a display device;
    at least one sensor for computing the user's current position and orientation relative to an object of interest;
    a virtual three-dimensional model of the user's environment generated from location information detected in six dimensions comprising x, y, z, roll, pitch, and yaw dimensions;
    a route planner configured to generate a route given a start location and an end location, wherein the start location is the user's current position and orientation and the end location is the location of the object of interest; and
    a visualization creation module configured to create a video rendering following the route created by the route planner by integrating the virtual three-dimensional model of the user's environment and an image of the user's current environment, wherein the video rendering begins with the image of the user's current environment and seamlessly transitions to a sequence of frames comprising the virtual three-dimensional model of the user's environment, wherein the video rendering is displayed on the display device starting from the user's current viewpoint as seen in the image of the user's current environment, and wherein the visualization creation module utilizes faster than real-time rendering of the sequences of frames for the video rendering.

2. The system for conveying the spatial location of an object with respect to a user's current location as set forth in claim 1, wherein the display device comprises sensors for estimating the user's position and orientation.

3. The system for conveying the spatial location of an object with respect to a user's current location as set forth in claim 2, wherein the sensors are selected from a group consisting of tilt and accelerometer sensors.

4. The system for conveying the spatial location of an object with respect to a user's current location as set forth in claim 1, wherein the display device further comprises a camera configured to capture images from the user's current viewpoint, such that the images provide information regarding the user's current position and orientation.

5. The system for conveying the spatial location of an object with respect to a user's current location as set forth in claim 1, the system further comprising a remote server for communication with the display device.

6. A method for conveying, the spatial location of an object with respect to a user's current location, comprising the steps of:
    computing the user's current position and orientation relative to an object of interest;
    creating a virtual three-dimensional model of the user's environment using location information detected in six dimensions comprising x, y, z, roll, pitch, and yaw dimensions;
    generating a route given a start location and an end location, wherein the start location is the user's current position and orientation and the end location is the location of the object of interest; and
    creating a video rendering following the generated route by integrating the virtual three-dimensional model of the user's environment and an image of the user's current environment, wherein the video rendering begins with the image of the user's current environment and seamlessly transitions to a sequence of frames comprising the virtual three-dimensional model of the user's environment, wherein the video rendering is displayed on a display device starting from the user's current viewpoint as seen in the image of the user's current environment, and wherein the visualization creation module utilizes faster than real-time rendering of the sequences of frames for the video rendering.

7. The method for conveying, the spatial location of an object with respect to a user's current location as set forth in claim 6, further comprising transmitting, information of the user's position and orientation through a wireless network to a remote server, wherein the computation of the user's orientation is performed on the remote server.

8. The method for conveying the spatial location of an object with respect to a user's current location as set forth in claim 7, further comprising transmitting the video rendering from the remote server to the user through the wireless network.

9. The method for conveying the spatial location of an object with respect to a user's current location as set forth in claim 6, further comprising capturing images with a camera in the display device from the user's current viewpoint, such that the images provide information regarding the user's current position and orientation.

10. The method for conveying the spatial location of an object with respect to a user's current location as set forth in claim 6, wherein the user's position and orientation are computed using sensors in the display device.

11. The method for conveying the spatial location of an object with respect to a user's current location as set forth in claim 10, wherein the sensors are selected from a group consisting of tilt and accelerometer sensors.

12. A computer program product for conveying the spatial location of an object with respect to a user's current location, the computer program product comprising computer-readable instruction means stored on a non-transitory computer-readable medium that are executable by a computer for causing the computer to perform operations of:
  computing the user's current position and orientation relative to an object of interest;
  creating a virtual three-dimensional model of the user's environment using location information detected in six dimensions comprising x, y, z, roll, pitch, and yaw dimensions;
  generating a route given a start location and an end location, wherein the start location is the user's current position and orientation and the end location is the location of the object of interest; and
  creating a video rendering following the generated route by integrating the virtual three-dimensional model of the user's environment and an image of the user's current environment, wherein the video rendering begins with the image of the user's current environment and seamlessly transitions to a sequence of frames comprising the virtual three-dimensional model of the user's environment, wherein the video rendering is displayed on a display device starting from the user's current viewpoint as seen in the image of the user's current environment, and wherein the visualization creation module utilizes faster than real-time rendering of the sequences of frames for the video rendering.

\* \* \* \* \*